United States Patent
Turnbull et al.

[11] Patent Number: 6,092,201
[45] Date of Patent: Jul. 18, 2000

[54] METHOD AND APPARATUS FOR EXTENDING SECURE COMMUNICATION OPERATIONS VIA A SHARED LIST

[75] Inventors: James Arthur Turnbull; Ian H. Curry, both of Kanata; Paul C. Van Oorschot; Stephen William Hillier, both of Ottawa, all of Canada

[73] Assignee: Entrust Technologies, Canada

[21] Appl. No.: 09/014,185

[22] Filed: Jan. 27, 1998

Related U.S. Application Data

[63] Continuation-in-part of application No. 08/957,612, Oct. 24, 1997.
[51] Int. Cl.[7] .................................................. H04L 9/00
[52] U.S. Cl. .................... 713/201; 713/155; 713/158; 713/168; 380/231; 380/241; 380/278
[58] Field of Search ................................ 380/231, 232, 380/241, 278, 277; 713/155, 158, 168, 182, 201

[56] References Cited

PUBLICATIONS

Schneier, "Applied Cryptography", pp. 35, 37, 185, 186, 1995.

Primary Examiner—Thomas R. Peeso
Attorney, Agent, or Firm—Markison & Reckamp

[57] ABSTRACT

A method and apparatus for extending secure communication operations via shared lists is accomplished by creating a shared list in accordance with authorization parameters by one user and subsequently accessing the shared list via the authorization parameters by this and other users. To create the list, a user within the secured communication system determines whether it has been enabled, or authorized, to create a shared list. If so, the user identifies at least one other user to be added to the shared list. Having identified another user, the user creating the shared list verifies that the secure communication parameters (which includes a public key certificate of an end-user or of a certification authority) it has received regarding the another user is trustworthy. If the secure communication parameters are identified as trustworthy, the secure communication parameters of the another user are added to the shared list. To authenticate the shared list, the user creating the list digitally signs it. Once the shared list is created, other users, if authorized, may access the shared list to obtain certificates (e.g., encryption and/or signature verification certificates) of the users contained in the list.

29 Claims, 4 Drawing Sheets

METHOD AND APPARATUS FOR EXTENDING SECURE COMMUNICATION OPERATIONS VIA A SHARED LIST

This patent application is a continuation in part of co-pending patent application entitled METHOD AND APPARATUS FOR CREATING COMMUNITIES OF TRUST IN A SECURE COMMUNICATION SYSTEM having Ser. No. of 08/957,612, and having a filing date of Oct. 24, 1997.

TECHNICAL FIELD OF THE INVENTION

This invention relates generally to encryption and more particularly to utilizing shared lists to extend secure communication operations.

BACKGROUND OF THE INVENTION

As is known, to securely transmit data from one party to another in a secured communications system, the data is encrypted using an encryption key and an encryption algorithm. Such an encryption algorithm may be a symmetric key algorithm such as the data encryption standard (DES) while the encryption key is a corresponding symmetric key. A secure transmission begins when a sending party encrypts the data using the symmetric key algorithm and the symmetric key. Once the data is encrypted, it is transmitted to the receiving party over a transmission medium (i.e., the Internet, a telephone line, a local area network, a wide area network, an Ethernet link, etc.). Upon receipt, the receiving party decrypts the data using the same symmetric key, which must be transmitted to it or derived by it using an appropriate secure mechanism.

Encrypting data using public key algorithms is somewhat more computationally expensive than using a symmetric key algorithm, but public key systems offer the advantage of requiring that only a public key (of a public, private key pair) be authenticly shared between two parties, rather than a secret key be confidentially shared as in symmetric-key systems. Thus to obtain the cost savings benefits of symmetric key encryption and the key distribution advantage of public/private key pairs, a wrapped session key is provided to the receiving party along with the encrypted data. The wrapped session key is an encrypted version of the symmetric key, where the symmetric key has been encrypted using the public key (of a public/private key pair) of the receiving party. When the receiving party receives the encrypted message, it decrypts the wrapped session key, using its private key, to recapture the symmetric key. Having recaptured the symmetric key, the receiving party utilizes it to decrypt the message. Typically, symmetric keys are used for relatively short duration (e.g., a single communication, a set number of communications, an hour, a day, a few days), while encryption public keys are often (though not necessarily) used for a longer duration (e.g., a week, a month, a year, or more).

To further enhance security of encrypted data transmissions in the secured communications system, the sending party provides its signature with encrypted messages that it transmits. The signature of the sending party consists of a tag computed as a function of both the data being signed and the signature private key of the sender. The receiving party, using the corresponding signature verification public key of the sending party, validates the signature. To ensure that the receiving party is using an authentic signature verification public key of the sending party, it utilizes the sending party's signature public key certificate, obtained from the sending party itself, from a directory, from a certification authority, or from any other available source. The signature public key certificate includes the public key of the sending party and a signature of a certification authority. The receiving party, using a trusted public key of the certification authority, verifies the signature of the certification authority on this certificate. Thus, the signature public key certificate is verified, which, in turn, allows the receiving party to trust the signature public key of the sending party to verify its signature.

As mentioned, a directory or other server/repository and/or a certification authority stores signature verification public key certificates of end-users within the communications system. End-users may also store their own certificates, for example their signature verification certificate. The directory and/or other sources may also store encryption public key certificates of the end-users. As such, any user (e.g., an end-user, a certification authority/administrator, etc.) that desires for example, to encrypt a message using the public key of another user, can access the directory to retrieve such information. If a user is preparing an outgoing message and the recipient list, (i.e., the targeted users of the message) is relatively small, e.g., less than 10, it is not too burdensome for the user to individually retrieve the encryption public key certificates from the directory. As the number of recipients increases, however, the burden of individually retrieving encryption public key certificates increases proportionally. Thus, a user formulating an outgoing message for a large number of recipients must endure the burdensome process of individually accessing a number of certificates from the directory.

To facilitate the generation of outgoing messages for a large number of recipients, a shared recipient list may be used. The shared recipient list includes the identities of each of a targeted group of recipients. Typically, a targeted group of recipients is grouped based on functionality of the end-users, where each targeted group of recipients is listed in a separate shared recipient list. For example, a company may create a shared recipient list for its accounting department, finance department, marketing department, engineering department, etc, even when the recipients are at different locales. Thus, for an end-user to create an outgoing message for a department of the company, the end-user can create the message and select the appropriate shared recipient list. The end-user's computer, via an encryption software program or process utilizes the shared recipient list lo retrieve the encryption public key certificates of the recipients identified in the list. The end-user's computer retrieves the certificates from a directory or a plurality of directories. If the computer does not have access to the directory, or to one of the directories, it cannot retrieve the corresponding certificate (s). Thus, the outgoing message cannot be completely prepared until the computer has access to all necessary certificates.

If the end-user does not have access to a directory, it may obtain the needed certificates from another end-user, possibly a priori in anticipation of this circumstance. While this approach allows the end-user to obtain a certificate of other end-users, it is done on a user-by-user basis. As such, it could be a quite burdensome process to obtain the certificates in this manner Therefore, a need exists for a method and apparatus that extends secure communication operations by obtaining trustworthy certificates from end-users that maintain a shared list.

DETAILED DESCRIPTION OF A PREFERRED EMBODIMENT

Generally, the present invention provides a method and apparatus for extending secure communication operations via shared lists. This is accomplished by creating a shared list in accordance with authorization parameters by one user and subsequently accessing the shared list via the authorization parameters set by this and other users. To create the list, a user (e.g., an end-user, a certification authority/administrator, etc.) within the secured communication system determines whether it has been enabled, or authorized, to create a shared list. If so, the user identifies at least one other user to be added to the shared list. Having identified another user, the end-user creating the shared list verifies that the secure communication parameters (which may include encryption public key certificate, signature verification public key certificate, and/or a signature verification public key certificate of a certification authority) it has received regarding the another user is trustworthy. If the secure communication parameters are verified as trustworthy, the secure communication parameters of the another user are added to the shared list. To authenticate the shared list (i.e. allowing subsequent verification of its authenticity), the user creating the list signs it. Once the list is created, other users, if authorized, may access the shared list to retrieve certificates (e.g., encryption and/or signature verification) of the users contained in the list. With such a method and apparatus, users can access a user created shared list to retrieve certificates for each member of a group of recipients without having to access a directory. Thus, if a user does not have access to a directory, it can still process secure communications, i.e., encrypt outgoing messages with the public keys of the intended recipients and verify signatures on received messages. The shared list also allows an end-user the ability to obtain certificates of a group of end-users, certification authorities, and/or administrators simultaneously from another user, instead of a certificate at a time. In addition, the present method and apparatus provides control over the ability to create, use and/or modify a shared list.

Figure 1:
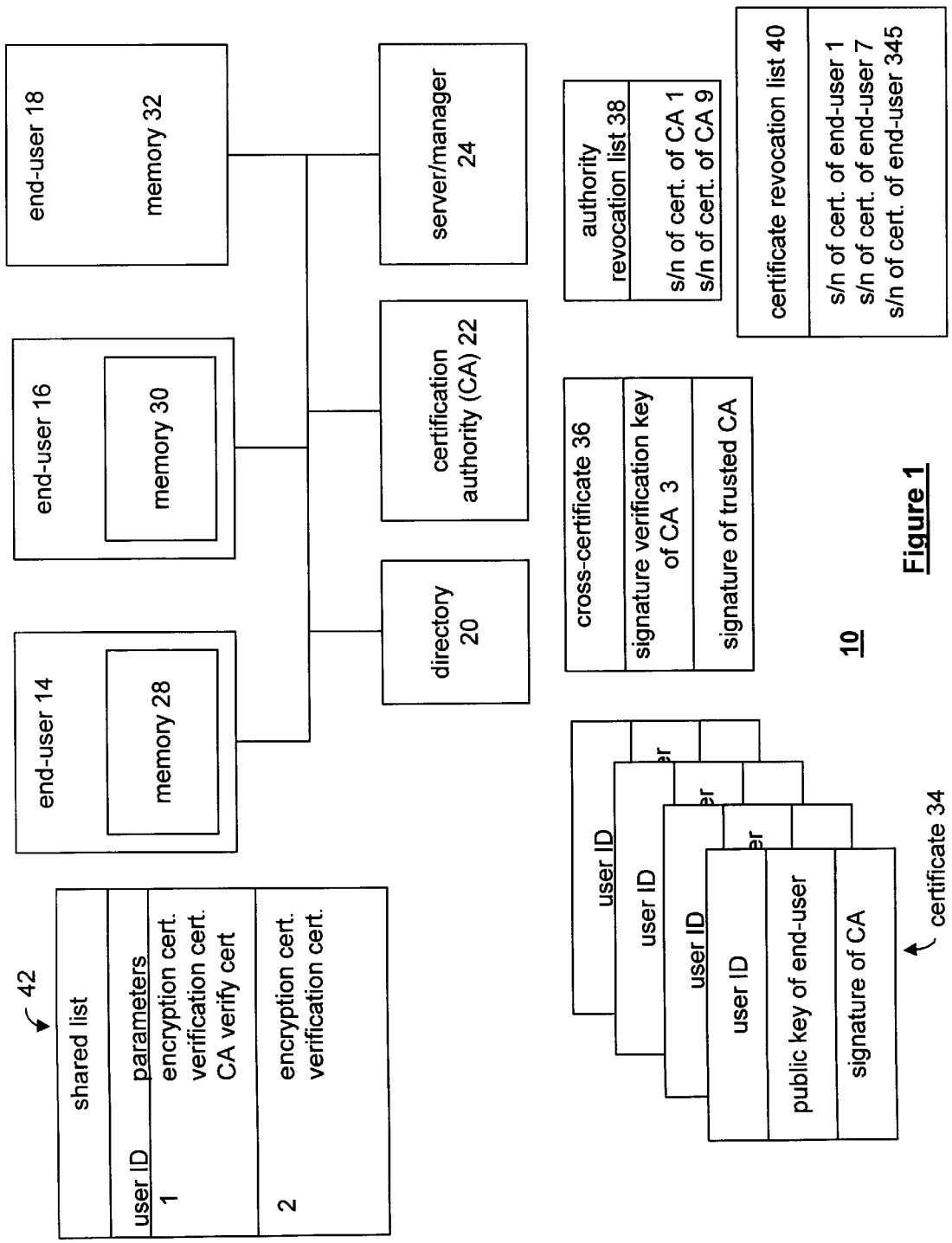
FIG. 1 illustrates a schematic block diagram of a secured communications system in accordance with the present invention.

The present invention can be more fully described with reference to FIGS. 1 through 5. FIG. 1 illustrates a schematic block diagram of a secured communications system 10 that includes a plurality of end-users 14–18, a directory 20, a certification authority 22, and a server or security management device (hereafter server/manager) 24. The end-users 14–18 may be personal computers, laptop computers, work stations, personal digital assistants, or any other device that manipulates digital information based on programming instructions that include encryption software. Note that, in the secured communication system, end-users only transceive secure communications and do not have administrative responsibilities for any other end-user. An end-user that has administrative responsibilities for other end-users is referred to as an administrator. The programming instructions executed by the end-users will described below stored in memory 28–32 and may, for example, be based on encryption software such as Entrust/Client manufactured by Entrust Technologies, Limited. The memory 28–32 may be read-only memory, random access memory, hard drive memory, floppy disk memory, magnetic tape memory, or any other means for storing digital information.

The directory 20 is a repository, or database, of certificates (e.g., verification and/or encryption), cross-certificates 36, authority revocation lists 38, and certificate revocation lists 40. The directory 20 may be a stand-alone database (or repository accessible by a suitable interface, for example Lightweight Directory Access Protocol LDAP) or contained within the certification authority 22 and/or the server/manager 24. The certification authority 22 may be a stand-alone computer that controls policy issues for the secured communications system 10. Alternatively, this policy could be set by the server/manager 24. The security policy of the system 10 indicates which users are authorized to create shared lists, which users are authorized to access the shared lists, under which conditions such access is allowed, which users can establish trust (i.e. communicate with securely, for example using encryption and/or digital signature functionality) with third party end-users (i.e., users not affiliated with the secured communications system 10 and/or not recognized by certification authority 22), and which users are authorized to modify shared lists. Note that the certificates may be any type of public key certificate and/or certificates that contain data items other than public keys, for example attribute certificates which might convey access privileges or authorization for certain actions.

As an alternative to the certification authority 22 being a stand-alone computing device, it may be embodied in the same computing device as the server/manager 24. The server/manager 24 administers the day to day operations of the secured communications system 10. For example, the day to day operations of the certification authority and/or server/manager include, but are not limited to, enabling end-users as members of a secure communications system, generating key pairs, generating certificates (e.g. for encryption or digital signatures), revoking certificates or public keys of end-users or other authorities which have previously been issued certificates, and key recovery (e.g. allowing end-users to be restored with encryption/decryption keys which have been lost, for example, due a forgotten password). Typically, to function as a server/manager 24, a computing device will include secure management software. For example, the secure management software may be Entrust/Manager manufactured by Entrust Technologies, Limited.

The certificates 34 stored in the directory 20, the server/manager 24, the certification authority 22, or at an end-user each include the identity of an end-user, the public key of the end-user, and the signature of the certification authority. The public key may be, but not by way of limitation, an encryption public key for an encryption public key certificate, a signature public key for a signature verification public key certificate, or any other public key. The directory 20 may also include cross-certificates 36 that include the signature verification public key of a second certification authority and the signature of a first certification authority. For example, the cross-certificate 36 may include the signature verification public key of a certification authority in a different secured communications system (e.g., CA #3) and is signed by the certification authority 22. The directory 20 may also store the authority revocation lists 38, which indicate the list of certification authority public keys that were previously endorsed (by virtue of their inclusion in an issued public key certificate) but are no longer trusted by the authority or entity which signs the revocation list. Thus, any certificates signed by keys identified in the revocation list 38 are untrustworthy. In addition, the directory 20 may also store certificate revocation lists 40, which include a list identifying end-user certificates that have been revoked. The lists of revoked certificates for end-users and authorities may be on separate revocation lists, or on a combined list.

Any of the users (i.e., the plurality of end-users, a certification authority, an administrator, and/or a server/manager), may be authorized to generate a shared list 42, which includes the user identity and secure communication parameters. The secured communication parameters may be for example, but not limited to, an encryption public key certificate, a signature verification public key certificate, any other type of public key certificate or other certificate, trusted public key, and/or a certification authority verification certificate. For example, if the identified user (e.g., the one being added to the list) is within the same secured communications system as the user creating the list, the secured communication parameters may not need to include the certification authority verification certificate. The creation of the shared lists will be discussed in ,greater detail with reference to FIG. 3 and the access to the shared lists will be discussed in greater detail with reference to FIG. 5.

Figure 2:
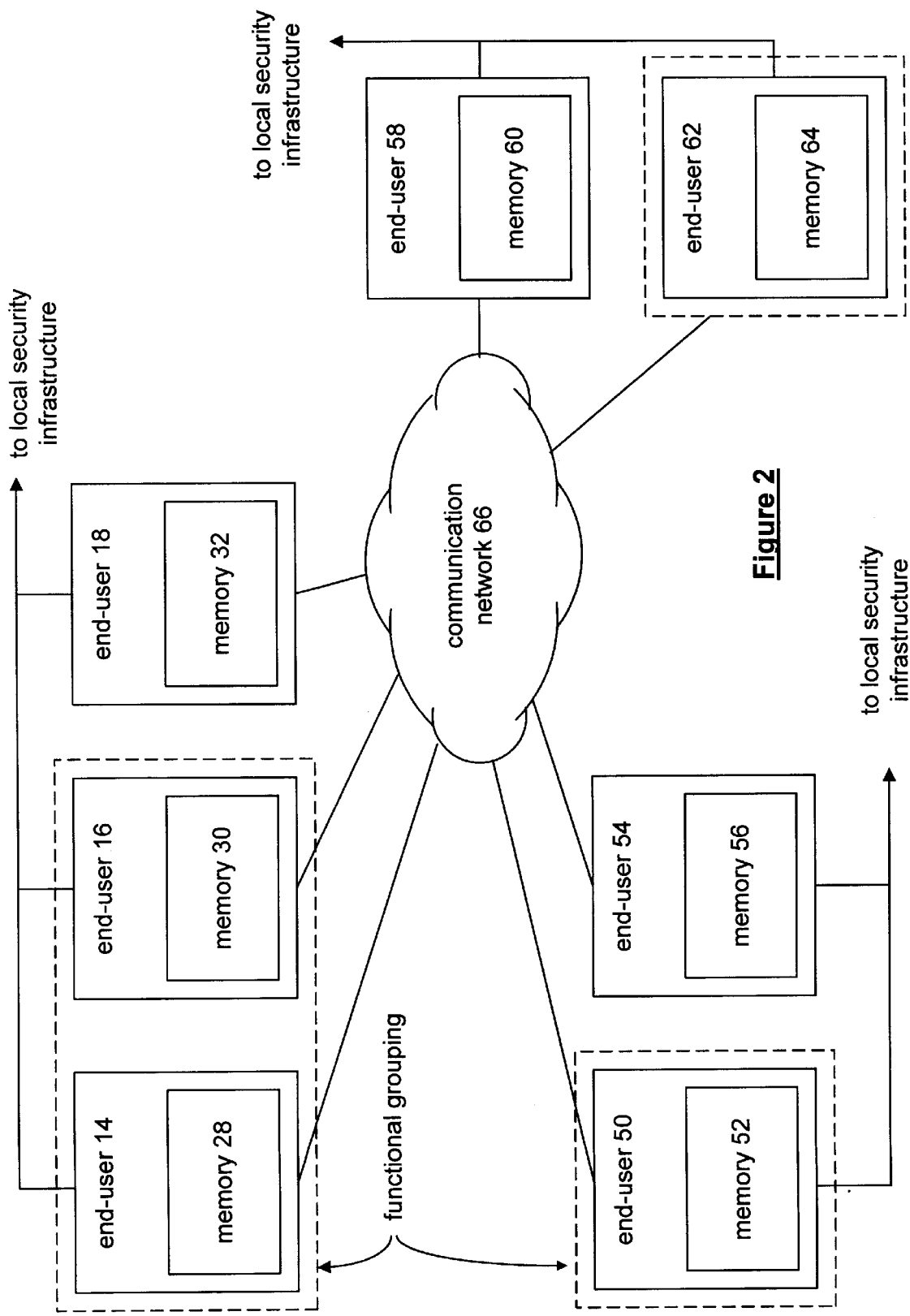
FIG. 2 illustrates a plurality of secured communication systems in accordance with the present invention.

FIG. 2 illustrates a secure communication environment that includes a plurality of secured communications systems 10. As shown, end users 14–18 are coupled to a local security infrastructure (e.g., the directory 20, certification authority 22, and service/manager of FIG. 1). End-users 50 and 54 are in a separate secured communications system and are coupled to their own local security infrastructure. End-users 58 and 62 are in their own secured communications system and coupled to their own local security infrastructure. While the end-users are in separate communication systems 10, they are each individually coupled to a communications network 66. The communication network 66 may be, but is not limited to, the Internet, public switch telephone network, or a wide area network.

The communication environment of FIG. 2 may be representative of a large corporation having offices distributed throughout a geographic region (e.g., a city, a county, a state, a country, a continent, or the world), or may be representative of distinct business entities in the same geographic region. For example, end-users 14–18 may be in one locale while, end-users 50 and 54 are in another locale and end-users 58, and 62 are in yet another locale. In each locale, there is a local secure communications system 10 that includes at least one of the directory 20, the certification authority 22, and the service/manager 24. End-users in different locales, while being members of the same functional grouping, might not have direct access to the directories at the other locales.

To overcome the lack of direct access, the present invention authorizes and allows a user to create a shared list that includes the needed certificates to process secure communications. For example, assume that end-user 14 has been authorized to establish a shared list for its functional group of end-user 14, 16, 50, 54, and 62. To begin, end-user 14 creates the shared list to include its certificates and the certificates of end-user 16, which it obtains from the directory of the local security infrastructure. End-user 14 then attempts to add the certificates of end-user 50 and end-user 62 to the shared list. Before the certificates of end-users 50 and 62 are added to the list, end-user 14 verifies that the certificates (i.e., the secure communication parameters) are trustworthy. End-user 14 can verify the trustworthiness of the certificates in a variety of ways. For example, trust may be established via personal contact, a chain of certificates including cross-certificates, a trusted third party, checks on certificate revocation status, or any combination thereof. Once the list is created, end-user 14 signs it to provide protection.

End-user 14 then places the shared list in a place that is readily accessible to at least one end-user who desires access to the security parameters of users in the functional grouping. Note that the end-user desiring to access the list may or may not be identified in the list and in some instances, the users listed may not be able or authorized to learn the identities of other users on the list (e.g., classified lists). The readily accessible place may be, for example, on-line such that other users may access the list via e-mail, file transfer protocol (FTP), hypertext transfer protocol (HTTP), or other similar connective devices. When a user accesses the shared list, it first verifies the signature of end-user 14. For end-user 16, this is done using the signature verification public key certificate of end-user 14. For end-users 50 and 62, they must first establish trust with end-user 14, for example, by obtaining a trusted copy of end-user 14's public key, such that they may be able to verify end-user 14's signature. While the present discussion is utilizing digital signatures in a specific application, the digital signature verification process should be construed to include any type of digital authorization or commitment.

Once end-user 14's signature has been verified, the user may process a secure communication. The secure communication may be processed by verifying the signature of a received message using a signature verification public key certificate stored in any of the accessible and authorized shared lists. Alternatively, the secure communication may be processed by specifying the list, which identifies each user in the list as a recipient, obtaining the encryption public key for each user, and encrypting an outgoing message based on the encryption public keys. Each of the encryption public keys is obtained from the user's corresponding encryption public key certificate. The encrypted message is then provided to each user in the list. As such, to send a secure message, a user selects a shared list, and the shared list name is automatically translated into the list of users in that group and accesses the public key certificates of each user. Having the public key certificates, the public encryption key readily can be obtained. The encryption public key may be used to encrypt the message directly or used to wrap a session key. As another alternative, the encrypted message may be provided to only a subset of the users identified in the shared list, as selected by the sending user.

Figure 3:
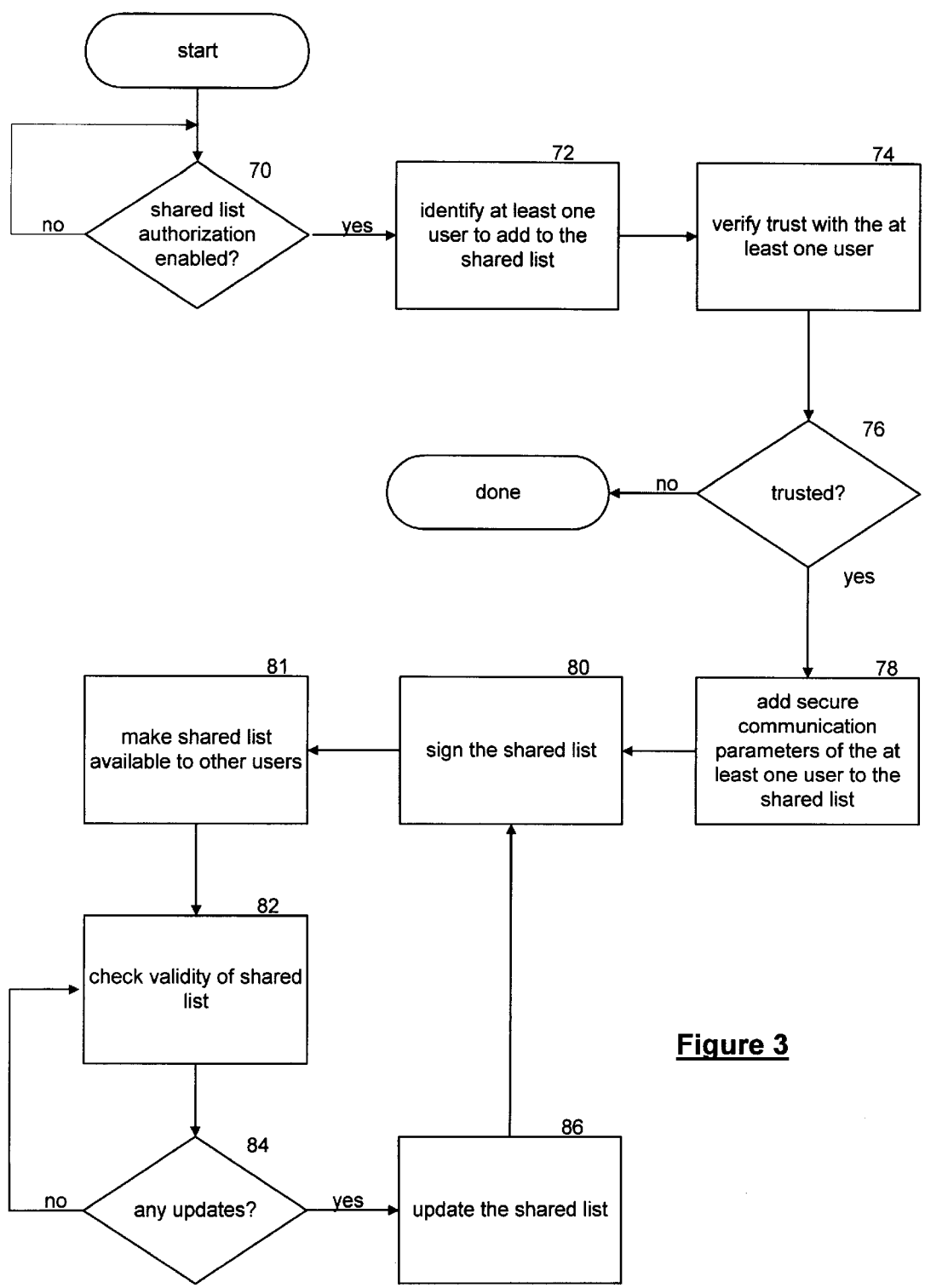
FIG. 3 illustrates a logic diagram of a method for creating shared lists in accordance with the present invention.

FIG. 3 illustrates a logic diagram of a method for generating a shared list. The process begins at step 70 where a determination is made as to whether shared list authorization is enabled. Such authorization will typically be established by the server/manager of the secure communication system 10 and, for example, indicated in the certificate (verification and/or encryption) of the user or by other means. For example, a published list of authorized creators and/or authorized users may be created, where the authorized creator list or user list is made available in a directory or as data transferred to an end-user. Such a data transfer may be done when the end-user initializes with the system and/or periodically thereafter. Thus to verify whether a user is authorized, the user simply checks its signature verification public key certificate and/or its encryption public key certificate, its local data stores which specify configuration information, or other appropriate location(s). To provide this information, if such indication is within a user's public key certificate, such certificates need to be modified to include a shared list authorization field. The authorization field could, for example, indicate whether the user is authorized to create a shared list, to modify a shared list whether created by itself or another user (for example, before itself signing and providing the modified list to other users), to access a shared list, to access a shared list created by the particular entity which signed the shared list in question, and to redistribute a shared list to an external party (for example a certification authority or server/manager or end-user not part of the secured communication system with which the user is affiliated).

The process then proceeds to step 72 where at least one user to be added to the shared list is identified. Identifying a particular user to add to the shared list may be done based on personal preferences of the user's operator such as users operated by family members, business co-workers, friends, etc., or may be based on functional grouping within a corporation such as users operated by personnel in marketing, finance, engineering, etc. (Recall that a user may be an end-user, certification authority, administrator, or a server/manager.)

The process then proceeds to step 74 where the user creating the shared list verifies trust with the at least one user. The trust may be verified in any one of a plurality of ways. For example, trust may be established by obtaining the secured communication parameters from a trusted locale (e.g., hard disk, floppy disk, or data storage medium in a trusted environment), or entity within the user's secure communication system (e.g., a certification authority, a server/manager, another user in the same secure communication system) and verifying the signature or relying upon the integrity of the trusted locale, or having obtained the parameters from a trusted user over a secured or trusted communications path or method (such as personal exchange). As another example, the secure communication parameters would be reviewed to determine whether they are within a validity period, which indicates the duration for which the secured communication parameters are valid. As yet another example, the secure communication parameters may be trusted when they were signed by a trusted party. As yet a further example, the secure communication parameters would be compared against a certificate revocation list and/or authority revocation list. A still further example includes determining appropriate key usage of the security information, such as encryption keys are used for encryption purposes and signature keys are used for signature purposes. Yet a still further example includes determining that the certificates were created in compliance with security policy related to creation, modification, and usage of the shared list.

The process then proceeds to step 76 where a determination is made as to whether the trust has been established with the identified user. If not, the process repeats at step 70 for a subsequent identified user. If, however, trust is established, the process proceeds to step 78. At step 78, secured communication parameters of the identified user are added to the shared lists. If the identified user is associated with a different trusted third-party, the encryption certificate, and/or the verification certificate, and the associated certification authority verification certificate of the identified user are added to the shared list. Note that additional authentication information may be included in the list, or contained in the list instead of the certificates. For example, this could include information related to revocation status, such as a certificate revocation list, or information specifying a validity period of the shared list itself. (In the latter case, if the list creator checks revocation status upon creating the list, and lists are updated frequently, then list users need not themselves check revocation status upon using the list.) As another alternative, other types of certificates could also be included. As previously mentioned, if the identified user is within the same secure communication system, the certification authority verification certificate may not need to be included in the shared list, especially if the list will only be used by users in the same secure communication system.

Having added the secure communication parameters of the identified user to the shared list, the process proceeds to step 80 where the user creating the list signs it. After signing the list, the process proceeds to step 81, where the newly created shared list is made available to other users in an appropriate manner, for example by publishing the list on a known server site, or by transfer to other users for example by electronic mail.

As an ongoing process once the list is made available to other users, it is continually verified, which begins at step 82. Such verification may be done at the time of creation of a shared list and/or at subsequent times for periodic updates (e.g., every hour, every few hours, daily, weekly, etc.) The periodic updates may include modifying the list to take into account changes in revocation status. This may be done, for example, by checking their revocation status by consulting a certificate revocation list (CRL) or on-line certificate status server (e.g., a server that responds with an indication of the validity status of a queried certificate); invalid certificates are removed from the list. The updates may also include modifying the list for other reasons, such as to update the logical group which the list represents (for example, if the shared list corresponds to the marketing team in a company, and the marketing team is expanded). Note that the verification of step 82 may further include comparing the entries in the shared list against a validity period (e.g., one week, one month, one year, etc.). If the validity, period has expired for one of the entries, it is flagged as a match for the subsequent steps.

Having done this, the process proceeds to step 84 where a determination is made as to whether any updates are required, or any matches occurred between the shared list and the revocation lists. If not, the process reverts back to step 82, to allow a periodic update at a subsequent time. If, however, an update is required or a match has occurred between the shared list and the revocation list, the shared list is updated by adding new entries to the list, or by deleting the certificates that have been revoked. Once the shared list is updated, the user creating the list signs it to certify that the shared list is valid.

Figure 4:
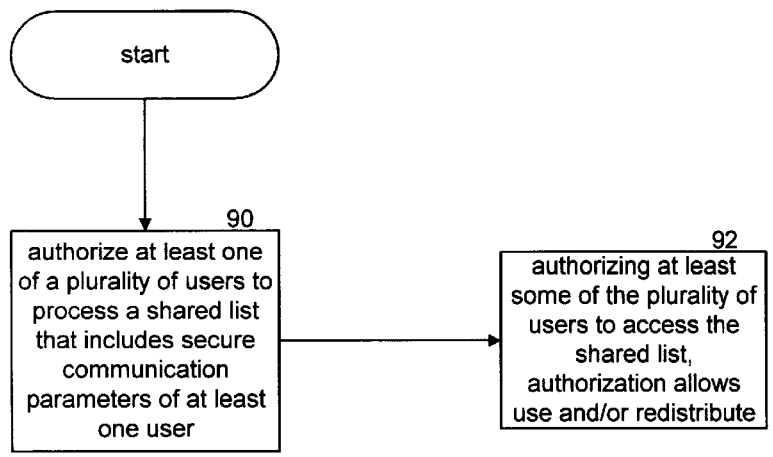
FIG. 4 illustrates a logic diagram of a method for establishing authorization to create and/or access shared lists in accordance with the present invention.

FIG. 4 illustrates a logic diagram of a method for establishing authorization to create, modify, and/or access shared lists. The process begins at step 90 where a certification authority and/or server/manager authorizes at least one user to process a shared list. The shared list includes secure communication parameters of at least one user. The authorizing of the at least one user further includes instructions that the user must sign the shared list, or otherwise authenticate it, such that users accessing the shared list may authenticate the shared list via the signature, or other mechanism, of the user creating the list. The user creating the list may store the shared list on-line where other users may readily access it, or otherwise make it available to other users (for example, by electronic mail, by direct exchange, or file transfer protocol). The authorizations granted to the user to create the shared list may include creating the shared list, adding entries to the shared lists, deleting entries to the shared list, storing the shared list on-line, authorizing access to the shared list by other users, and/or modifying entries in the shared list.

Having authorized an end-user to create a shared list, the process proceeds to step 92. At step 92 the certification authority and/or service/manager authorizes at least some of the plurality of users to access the shared list. For example, a default condition might be that all users are allowed to access the shared list. The authorization may restrict the access to strictly using the shared list, allowing end-users to redistribute the list to other end-users, and/or resign the shared list. The authorization may prevent the end user from locally storing the shared list, such that the user is accessing the shared list as if it were an online directory or from an online source. The advantage here is that revocations or list updates/modifications can then be effectively reflected in the updated shared lists. In this mode, the user may be required to verify the security communication parameters before each secured communication, e.g., verify the signature of the certification authority that signed the certificate, and the current validity status.

Figure 5:
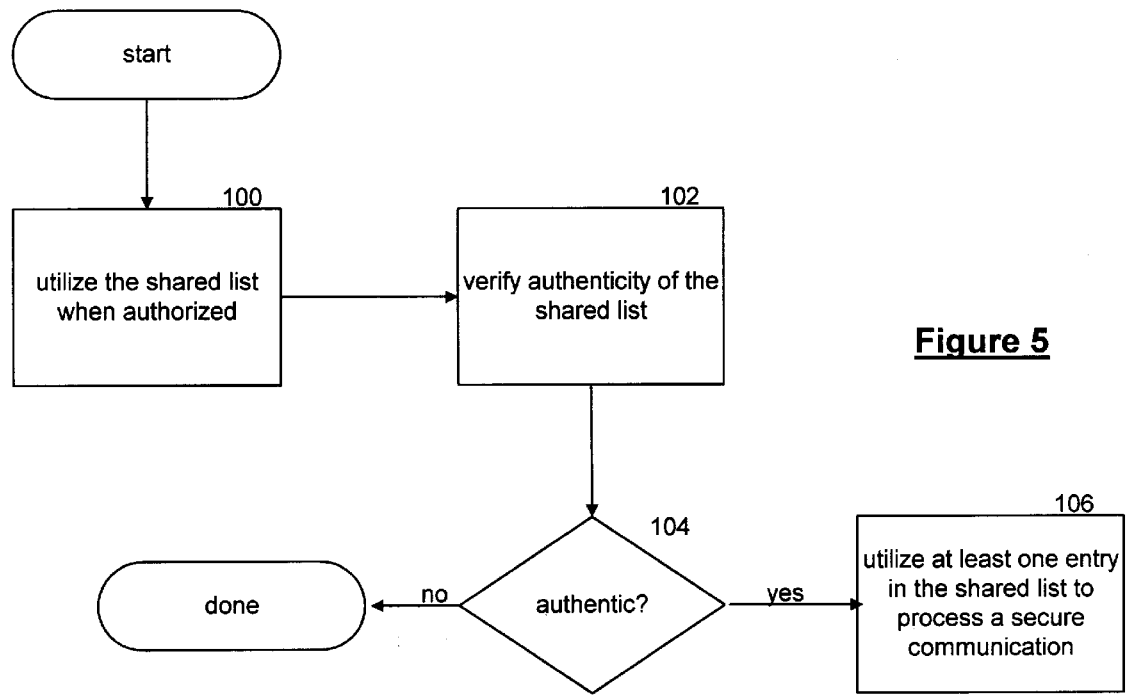
FIG. 5 illustrates a logic diagram of a method for accessing shared lists in accordance with the present invention.

FIG. 5 illustrates a logic diagram of a method for utilizing a shared list. The process begins at step 100 where an end-user utilizes the shared list when authorized. As such, the end-user first needs to determine that it is authorized to utilize the shared list. Note that the shared list may be stored locally within a secure communication system 10 or may be stored in a remote location such that the user would have to access a network connection. This was described with reference to FIG. 2.

The process then proceeds to step 102 where the utilizing user verifies authenticity of the shared list. The authenticity may be verified by verifying the signature of the user that created the shared list or some other authentication means. Such other authentication means includes, for example, obtaining the shared list over a secured channel such as SSL (U.S. Pat. No. 5,657,390) or SPKM (Internet RFC 2025), but without a signature on the list itself. In these examples, the trust in the list is established when the secure channel is set up; the secure channel/pipe is authenticated, not the list itself directly. Another alternative to restrict access to the shared list is to encrypt the list such that it can be decrypted only by authorized users (for example by encrypting the list using encryption parameters (e.g., public keys) of the authorized users, such that one of the corresponding private keys is needed to gain access to the list). The process then proceeds to step 104 where a determination is made as to whether the shared list is verified as authentic. If not, the process is complete for this request. If, however, the authentication check succeeds, the process proceeds to step 106.

The verification at step 102 may optionally include check for revocation status similar to that described in reference to FIG. 3, and other checks such as a validity period on the list itself. Such revocation status checking introduces additional processing, but the certificates themselves need not be retrieved from the directory, and the certificates could indicate how to check for revocation, for example by containing a location pointer for a certificate revocation list or an address of an on-line status service. In an alternate embodiment, a user accessing the list relies upon successful verification of the list creator's signature as evidence that the list contains only valid communications parameters, and carries out no further checks on the validity of communications parameters within the list (such as revocation status checks). In another embodiment, the parameters in the shared list include a revocation list or other revocation information, and a user accessing the list employs such revocation information to verify continued validity of a certificate on the shared list. At step 106, the user accessing the shared list utilizes at least one entry in the shared list to carry out a process in a secured communications system. The process in a secured communications system could be, for example, utilizing the encryption public key of a recipient or a plurality of recipients to generate an outgoing message or utilizing a verification public key to verify signature of a received message.

The preceding discussion has presented a method and apparatus for extending secured communications via shared lists, which include security parameters of users contained in the lists. As such, when accessing the shared list, users may directly utilize the verification and/or encryption public key certificates contained therein to process secured communications. Thus, users are provided with more flexibility and convenience. This allows increased functionality in off-line communications environments, as well as convenient establishment of trust with third-party users. Note that, throughout the preceding discussion, the term user has been used to refer to an entity that performs the operations of the present invention. As one of average still in the art will readily appreciate, a "user" includes software to achieve the described desired results that may be executed on a computing device. Further note that the execution of the user software may be initiated by a person, a computing device, another user, or any combination thereof. Still further note that any examples provided with reference to operation by an end-user may also be performed by any other type of user.

What is claimed is:

1. A method for extending secure communication operation via a shared list, the method comprises the steps of:
   a) determining whether shared list authorization is enabled;
   b) when the shared list authorization is enabled, identifying at least one user to be added to the shared list to produce at least one identified user;
   c) verifying trust with the at least one identified user; and
   d) when the trust is established with the at least one identified user, adding secure communication parameters of the at least one identified user to the shared list.

2. The method of claim 1, wherein the secure communication parameters includes at least one of an encryption certificate, a verification certificate, and certification authority verification certificate.

3. The method of claim 1 further comprises at least one of signing the shared list by a user that created the shared list to certify the shared list and encrypting, the shared list based on encryption parameters of at least one authorized user.

4. The method of claim 1 further comprises, within step (a), determining whether the user is authorized to create the share list by analyzing at least one of: a certificate of a user, a list of authorized users, and a data transfer to the user.

5. The method of claim 1 further comprises, when the at least one identified user is associated with a trusted third party, adding the encryption certificate, the verification certificate, and the associated certification authority verification certificate of the at least one identified user to the shared list.

6. The method of claim 1 further comprises:
   verifying entries in the shared list, wherein the verifying includes at least one of: determining revocation status and determining whether a validity period has expired; and
   updating the shared list when an entry in the shared list has at least one of a revocation status change and the validity period has expired.

7. The method of claim 1 further comprises, within step (c), verifying the trust with the at least one identified user by at least one of:

i) obtaining the secure communication parameters from at least one of: a trusted user and a trusted locale, ii) verifying the secure communication parameters are within a validity period;

iii) verifying that the secure communication parameters were signed by a trusted party;

iv) determining revocation status of the associated authorities and certification authorities;

v) determining revocation status of the at least one identified user;

vi) determining appropriate key usage of the security information; and vii) determining policy compliance of creation, modification, and usage of the shared list.

8. A method for extending secure communication operation via a shared list, the method comprises the steps of:

a) authorizing at least one of a plurality of users to process the shared list, wherein the shared list includes secure communication parameters of at least one user; and b) authorizing at least some of the plurality of users to utilize the shared list, wherein the authorizing includes at least one of: using the secure communication parameters of the at least one user and redistributing the shared list to another end user.

9. The method of claim 8 further comprises, within step (a), authorizing the at least one of the plurality of users to sign the shared list, wherein the at least some of the plurality of users utilize a signature of the at least one of the plurality of users to authenticate the shared list.

10. The method of claim 8 further comprises requiring the at least some of the plurality of users to validate entries in the shared list before using the secure communication parameters.

11. The method of claim 8 further comprises preventing the at least some of the plurality of users from locally storing the shared list.

12. The method of claim 8 further comprises authorizing the at least ore of the plurality of users to store the shared list on-line and authorizing the at least some of the plurality of users to access the shared list on-line.

13. The method of claim 8 further comprises, within step (a), authorizing the at least one of the plurality of user to process the shared list by performing at least one of: creating the shared list, adding entries to the shared list, deleting entries from the shared list, authorizing access to the shared list, redistributing the shared list, resigning the shared list, and authorizing modification of entries in the shared list.

14. A method for extending secure communication operation via a shared list, the method comprises the steps of:

a) utilizing the shared list, wherein the shared list was created by at least one of a plurality of users and wherein the shared list includes secure communication parameters;

b) verifying validity of the shared list; and c) when the shared list is valid, utilizing at least one entry in the shared list to process a secure communication.

15. The method of claim 14 further comprises, within step (b), verifying signature of the at least one of the plurality of users to authenticate the shared list.

16. The method of claim 14 further comprises at least one of:

selecting the shared list by a shared list name;
accessing the shared list via a network connection;
obtaining a list of users from the shared list name;
accessing public key certificates for each user in the list of users;

securing a message for each of the users based on public keys extracted from the public key certificates.

17. The method of claim 14 further comprises determining whether the shared list is modifiable by another user; and when the shared list is modifiable by the another user, modifying the list by the another user.

18. A digital storage medium for storing programming instructions that, when read by a processing unit, causes the processing unit to extend secure communication operation via a shared list, the digital storage medium comprises:

first storage means for storing programming instructions that, when read by the processing unit, causes the processing unit to determine whether shared list authorization is enabled;

second storage means for storing programming instructions that, when read by the processing unit, causes the processing unit to identify at least one user to be added to the shared list to produce at least one identified user when the shared list authorization is enabled;

third storage means for storing programming instructions that, when read by the processing unit, causes the processing unit to verify trust with the at least ore identified user; and fourth storage means for storing programming instructions that, when read by the processing unit, causes the processing unit to add secure communication parameters of the at least one identified user to the shared list when the trust is established with the at least one identified user.

19. The digital storage medium of claim 18 further comprises means for storing programming instructions that, when read by the processing unit, causes the processing unit to perform at least one of sign the shared list by a user that created the shared list to certify the shared list and encrypt the shared list based on encryption parameters of at least one authorized user.

20. The digital storage medium of claim 18 further comprises means for storing programming instructions that, when read by the processing unit, causes the processing unit to determine whether the user is authorized to create the shared list by analyzing at least one of: a certificate of a user, a list of authorized users, and a data transfer to the user.

21. The digital storage medium of claim 18 further comprises means for storing programming instructions that, when read by the processing unit, causes the processing unit to:

verify entries in the shared list, wherein the verifying includes at least one of determining revocation status and determining whether a validity period has expired; and update the shared list when an entry in the shared list has at least one of a revocation status change and the validity period has expired.

22. A digital storage medium for storing programming instructions that, when read by a processing unit, causes the processing unit to extend secure communication operation via a shared list, the digital storage medium comprises:

first storage means for storing programming instructions that, when read by the processing unit, causes the processing unit to authorize at least one of a plurality of users to process the shared list, wherein the shared list includes secure communication parameters of at least one user; and second storage means for storing programming instructions that, when read by the processing unit, causes the processing unit to authorize at least some of the plurality of users to utilize the shared list, wherein the authorizing includes at least one of using the secure communication parameters of the at least one user and redistributing the shared list to another end user.

23. The digital storage medium of claim 22 further comprises means for storing programming instructions that, when read by the processing unit, causes the processing unit to authorize the at least one of the plurality of users to sign the shared list, wherein the at least some of the plurality of users utilize a signature of the at least one of the plurality of users to authenticate the shared list.

24. The digital storage medium of claim 22 further comprises means for storing programming instructions that, when read by the processing unit, causes the processing unit to require the at least some of the plurality of users to validate entries in the shared list before using the secure communication parameters.

25. The digital storage medium of claim 22 further comprises means for storing programming instructions that, when read by the processing unit, causes the processing unit to prevent the at least some of the plurality of users from locally storing the shared list.

26. The digital storage medium of claim 22 further comprises means for storing programming instructions that, when read by the processing unit, causes the processing unit to authorize the at least one of the plurality of user to process the shared list by performing at least one of: creating the shared list, adding entries to the shared list, deleting entries from the shared list, authorizing access to the shared list, redistributing the shared list, resigning the shared list, and authorizing modification of entries in the shared list.

27. A digital storage medium for storing programming instructions that, when read by a processing unit, causes the processing unit to extend secure communication operation via a shared list, the digital storage medium comprises:

first storage means for storing programming instructions that, when read by the processing unit, causes the processing unit to utilize the shared list, wherein the shared list was created by at least one of a plurality of users and wherein the shared list includes secure communication parameters;

second storage means for storing programming instructions that, when read by the processing unit, causes the processing unit to verify validity of the shared list;

third storage means for storing programming instructions that, when read by the processing unit, causes the processing unit to utilize at least one entry in the shared list to process a secure communication when the shared list is valid.

28. The digital storage medium of claim 27 further comprises means for storing programming instructions that, when read by the processing unit, causes the processing unit to verify a signature of the at least one of the plurality of users to authenticate the shared list.

29. The digital storage medium of claim 27 further comprises means for storing programming instructions that, when read by the processing unit, causes the processing unit to perform at least one of:

select the shared list by a shared list name;

access the shared list via a network connection;

obtain a list of users from the shared list name;

access public key certificates for each user in the list of users;

secure a message for each of the users based on public keys extracted from the public key certificates.

* * * * *